(12) United States Patent
Dobschal et al.

(10) Patent No.: US 11,187,903 B2
(45) Date of Patent: Nov. 30, 2021

(54) LIGHT GUIDE, IMAGING DEVICE AND HMD HAVING SEPARATE IMAGING CHANNELS

(71) Applicant: Carl Zeiss Jena GmbH, Jena (DE)

(72) Inventors: Hans-Juergen Dobschal, Kleinromstedt (DE); Karsten Lindig, Erfurt (DE); Matthias Hillenbrand, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 16/761,247

(22) PCT Filed: Oct. 30, 2018

(86) PCT No.: PCT/EP2018/079652
§ 371 (c)(1),
(2) Date: May 2, 2020

(87) PCT Pub. No.: WO2019/086419
PCT Pub. Date: May 9, 2019

(65) Prior Publication Data
US 2020/0355924 A1     Nov. 12, 2020

(30) Foreign Application Priority Data
Nov. 3, 2017   (DE) .......................... 102017125731.4

(51) Int. Cl.
*G09G 5/00* (2006.01)
*G02B 27/01* (2006.01)
*G02B 27/09* (2006.01)

(52) U.S. Cl.
CPC ..... *G02B 27/0172* (2013.01); *G02B 27/0977* (2013.01); *G02B 2027/0123* (2013.01); *G02B 2027/0178* (2013.01)

(58) Field of Classification Search
CPC ............ G02B 27/0172; G02B 27/0977; G02B 2027/0123; G02B 2027/0178
(Continued)

(56) References Cited

U.S. PATENT DOCUMENTS

2001/0033401 A1* 10/2001 Kasai ................. G02B 27/0172
359/15
2008/0316606 A1* 12/2008 Inoguchi ............ G02B 27/1066
359/630
(Continued)

FOREIGN PATENT DOCUMENTS

DE        102014207492 A1   10/2015
JP           2002031777 A    1/2002

OTHER PUBLICATIONS

The International Search Report and Written Opinion rendered by the International Searching Authority for PCT/EP2018/079652, dated Jan. 30, 2019, 12 pages.
(Continued)

*Primary Examiner* — Jonathan M Blancha
(74) *Attorney, Agent, or Firm* — Skaar Ulbrich Macari, P.A.

(57) ABSTRACT

A light guide for an imaging apparatus for generating a virtual image from an initial image with at least two different initial image field regions is provided. The light guide includes an input coupling structure for coupling beams coming from the initial image into the light guide, and an extensive output coupling structure for coupling the beams that were coupled into the light guide out of the light guide. The extensive output coupling structure includes at least two partial faces. Each partial face is assigned to a different one of the initial image field regions and couples out the beams coming from the corresponding initial image field region. The partial faces of the output coupling structure are tilted
(Continued)

about two non-parallel axes. The light guide can be part of an imaging apparatus, which can be used in particular in a head-mounted display.

19 Claims, 8 Drawing Sheets

(58) Field of Classification Search
USPC .............................................................. 345/8
See application file for complete search history.

(56) References Cited

U.S. PATENT DOCUMENTS

| | | |
|---|---|---|
| 2011/0062998 A1 | 3/2011 | Mitsubori et al. |
| 2012/0057253 A1* | 3/2012 | Takagi ................ G02B 27/0172 |
| | | 359/861 |
| 2014/0226215 A1 | 8/2014 | Komatsu et al. |
| 2017/0184851 A1 | 6/2017 | Lindig et al. |
| 2017/0184855 A1 | 6/2017 | Takagi et al. |
| 2017/0235219 A1* | 8/2017 | Kostamo .......... B29D 11/00951 |
| | | 264/40.1 |
| 2017/0285347 A1 | 10/2017 | Cai et al. |
| 2017/0307895 A1 | 10/2017 | Dobschal et al. |
| 2018/0003862 A1* | 1/2018 | Benitez ................ H04N 13/344 |
| 2018/0373042 A1 | 12/2018 | Rudolph et al. |

OTHER PUBLICATIONS

Search Report by the German Patent Office for the German priority application No. 10 2017 125 731.4, dated Jul. 13, 2018, 9 pages.
Written Opinion rendered by the International Bureau of WIPO for PCT/EP2018/079652, dated Jan. 30, 2019, 5 pages.

* cited by examiner

LIGHT GUIDE, IMAGING DEVICE AND HMD HAVING SEPARATE IMAGING CHANNELS

PRIORITY

This application claims the benefit of German Patent Application No. 10 2017 125 731.4, filed on Nov. 3, 2017, and which is hereby incorporated herein by reference in its entirety.

FIELD

The present invention relates to a light guide for an imaging apparatus for generating a virtual image of an initial image represented on an image generator. The invention also relates to a head-mounted display, i.e. a display mounted on the head, or HMD for short.

BACKGROUND

One conventional form of head-mounted displays uses screens that are worn in front of the eyes and present the user with electronic images such as, for instance, computer-generated images or images recorded by cameras. Such head-mounted displays are often voluminous and do not allow direct perception of the surroundings.

In recent years, head-mounted displays which are able to combine electronic images with the directly perceived image of the surroundings and to thus present the user with an electronic image, without preventing direct perception of the surroundings, have been developed. Such head-mounted displays, which will be referred to as smartglasses hereinafter if they take the form of spectacles, enable this technology to be utilized in everyday life.

When combining the electronic images with the directly perceived image of the surroundings, a distinction is essentially drawn in the case of smartglasses between the following principles on which the combining can be based:
1. Using normal spectacles with a beam combiner (e.g. beam splitter cube) attached at the front.
2. Input coupling of the light between head and spectacle lens from the side and reflection of the light at the inner side of the spectacle lens toward the eye, wherein diffraction gratings, Fresnel elements or the like can be used in a supplementary manner.
3. Guiding the light of the electronic image by way of total internal reflection in the spectacle lens and combining the beam path of the electronic image with the direct image of the surroundings with the aid of an output coupling structure arranged in the spectacle lens and serving for coupling the beam path of the electronic image out of the spectacle lens in the direction of the eye. The spectacle lens is used here as a light guide for the coupled-in light.

Although the first principle functions well optically, it has found only very little social acceptance since the beam combiner attached at the front is outwardly very conspicuous and large. Moreover, the spectacles become front-heavy as a result.

The second principle can be realized anatomically only with a greatly increased distance between spectacles and head, which is likewise unacceptable.

Therefore, the more promising approaches proceed from the third principle, that is to say guiding light in the spectacle lens as a light guide. In this case, the output coupling structure can be embodied as a diffraction grating, as a partially transparent, inclined mirror or in the form of partially transparent Fresnel elements. In the case of a diffraction grating, the beam path of the electronic image is coupled out from the spectacle lens e.g. via the 1st order diffraction maximum, while via the 0 order diffraction maximum the observation light can pass through the output coupling structure with as little impairment as possible.

In an HMD operating in accordance with the third principle described above, divergent beams coming from a field point of the field represented by an initial image (referred to below as the initial image field) are typically collimated or largely collimated and guided in the light guide typically as collimated beams. The diameter of the beams is here defined by the entrance pupil of the imaging apparatus, of which the light guide is a part. The central rays of the beams will be referred to below as chief rays. The angle between the beams representing the left and right margins of the initial image field or between the chief rays of said beams, as it is measured in the region of the exit pupil, will be referred to as the horizontal field angle. The angle measured in the region of the exit pupil between the beams representing the vertical margins of the initial image field or between the chief rays of said beams is referred to as the vertical field angle. In the case of a large initial image field, large field angles—in particular large horizontal field angles—are present, which is the case in particular if for example an image in 16:9 format is to be represented. The field angle in this case leads to the cross-sectional area of the totality of the transferred beams becoming larger as the distance from the eye increases. As a consequence, the distance between the external chief rays in the case of large field angles becomes so great that light can generally no longer be coupled in via a side face of the spectacle lens but only via the spectacle lens rear or front face, resulting in large input coupling structures. A light guide in which beams are coupled in via the rear face, that is to say the face oriented toward the eye, is described for example in US 2011/0062998 A1.

US 2012/0057253 A1 describes an output coupling structure having two partial faces that are inclined with respect to one another.

DE 10 2015 122 131 B3 describes the inclination of a total Fresnel face used for coupling an imaging beam path out of a spectacle lens.

DE 10 2014 207 492 A1 describes Fresnel faces that are used for output coupling and effect imaging from the image generator or of an intermediate image of the image generator into the virtual intermediate image.

DE 10 2014 207 500 B3 describes a reflective layer that is located between the input coupling region of a spectacle lens and the output coupling structure of the spectacle lens and serves for beam guidance.

US 2014/0226215 A1 describes a light guide in a display for representing a virtual image, in which the imaging beam path is coupled into the light guide via the perimeter face of the light guide.

SUMMARY

It is the object of the present invention to provide a light guide, an imaging apparatus and an HMD in which the input coupling structures can be kept small.

This object is achieved in certain embodiments by a light guide, an imaging apparatus, and an HMD.

A light guide according to certain embodiments of an imaging apparatus for generating a virtual image from an initial image with at least two different initial image field regions may include:

an input coupling structure for coupling beams coming from the initial image into the light guide, and an extensive output coupling structure for coupling the beams that were coupled into the light guide out of the light guide, wherein the extensive output coupling structure comprises at least two partial faces and wherein each partial face is assigned to a different one of the initial image field regions and couples out the beams coming from the corresponding initial image field region.

The partial faces of the output coupling structure are tilted with respect to one another. In this case, the two partial faces of the output coupling structure are tilted about two axes that are not parallel to one another, preferably about two axes that are perpendicular to one another.

The tilting of the partial faces of the output coupling structure with respect to one another makes it possible to manipulate the cross-sectional area occupied by the beams transferred by the light guide in the region of the input coupling structure in a manner such that it makes adaptation of the cross-sectional area to the desired dimensions possible. In particular, the cross-sectional area can be reduced in the direction of the thickness of the light guide. This makes it possible to design the light guide such that it has a rear face, which is to face the eye of a user, a front face, which is to face away from the eye of the user, and a perimeter face connecting the rear face to the front face, wherein the input coupling structure is arranged in the light guide such that the beams can be coupled in via the perimeter face.

If, in a coordinate system in which the z-axis is perpendicular to the face representing the exit pupil and points toward the light guide, the two partial faces are tilted with respect to one another about the y-axis, then the beams arriving at the exit pupil can be guided through regions of the light guide that are offset with respect to one another in the x-direction. This makes it possible, for example, to use image generators that are offset with respect to one another in the x-direction for generating the initial image for representing different lateral initial image field regions.

Tilting of the partial faces with respect to one another about the x-axis, by contrast, makes it possible to guide the beams arriving at the exit pupil in the region of the input coupling structure closer together, resulting in a reduction in the extent of the beam distribution in the z-direction (direction of the thickness extent of the light guide). More specifically, if the beams in the region of the input coupling structure are projected onto the x-z-plane, the extent of this projection in the z-direction is reduced. This facilitates the use of input coupling structures having a smaller extent in the z-direction and can in this way make possible input coupling via a side face of the light guide, i.e. via a section of the perimeter face that is arranged laterally on the light guide, in particular also in the case of a large horizontal initial image field. The side face here at the same time can also form the input coupling structure.

Generally, it can be stated that owing to a tilting of the partial faces about two non-parallel axes, the beam distribution in the region of the input coupling structure can be manipulated so that the beam distribution in the region of the input coupling structure has a desired shape. In particular the aspect ratio of the cross-sectional area of the beam distribution can be changed. This makes it possible for example to offset beams such that initial image field regions located horizontally next to one another are represented by beams that are vertically offset in the region of the input coupling structure. It is additionally possible to also displace said beams horizontally with respect to one another. The initial image can in that case only be represented using an enlarged image generator or via an image generator having separate displays for the initial image field regions, but the face on which the initial image is represented or the position of the separate displays can be adapted optimally to the desired input coupling structure.

The partial faces of the output coupling structure used can be for example smooth reflective faces that are inclined with respect to the inner and front faces such that the beams guided through the light guide are coupled out through the rear face. A continuously differentiable face is to be considered in this case to be a smooth face.

Alternatively, each partial face of the output coupling structure can be a faceted reflective face, wherein the faceted reflective face comprises a smooth base face and facets that are inclined with respect to the smooth base face.

The smooth face or the smooth base face can be embodied as a planar face. However, it can also have an imaging function, for example a light-converging function. In this case, the smooth face or the smooth base face has a curvature. In the case of a faceted reflective face, the curvature can also be realized in the facets rather than in the smooth base face. The imaging function of the output coupling structure makes it possible to further reduce the required space of the beams in the direction of the thickness of the light guide in the region of the output coupling structure. The smooth face or the smooth base face can also be a freeform face. A freeform face in this case is to be understood to mean a complex face that can be represented in particular using regionally defined functions, in particular twice continuously differentiable regionally defined functions. These are to be distinguished from simple faces such as spherical faces, aspherical faces, cylindrical faces, toric faces, etc.

In an advantageous further design of the light guide according to additional embodiments, the latter may include, in addition to the output coupling structure, a further reflective element that can be embodied in particular as a smooth reflective face or faceted reflective face. This further reflective element has an imaging function. It can be realized in particular by a freeform face. In particular if the output coupling structure also has an imaging function, no further imaging optical elements are absolutely necessary in addition to the output coupling structure and the further reflective element having the imaging function.

If the output coupling structure has an imaging structure and/or a further reflective optical element having an imaging function is present, an intermediate image can be generated in the light guide between the output coupling structure and the input coupling structure, which intermediate image makes possible in the region of the input coupling structure a further reduction of the required space of the beams transferred by the light guide in the z-direction.

An imaging apparatus according to further embodiments for generating a virtual image may include an image generator having at least two image generator sections for representing at least two initial image field regions of an initial image and a light guide according to the disclosure herein. The image generator sections do not necessarily need to be joined or be a part of the same display here. In other words, the image generator can be embodied in the form of a single display or of an arrangement from at least two displays. The effects to be achieved with the imaging apparatus result directly from the use of the light guide and the associated, previously described effects.

In the imaging apparatus according to certain embodiments, the image generator sections can be offset with respect to one another. The offset of the image generator sections can here be realized along the x-axis and/or along the y-axis. This provides a large freedom in terms of the arrangement of the image generator sections, such that the arrangement of the image generator sections can be adapted to the shape of the desired input coupling structure and thus to the light guide.

The offset of the image generator sections can be realized by using a display that is large enough for allowing different initial image field regions to be represented on the display such that they are offset with respect to one another. The image generator sections are then given by the sections of the display on which the respective initial image field regions are represented. It is alternatively possible to provide a dedicated display for each initial image field region, wherein the displays then together form the image generator. In this case, the displays do not need to be larger than the initial image field regions to be represented, which means the combined display face does not need to be larger than the face of the initial image to be represented. The latter moreover makes it possible to not only optimize the position of the image generator sections, but also to optimize the relative inclination between the image generator sections, which can contribute to an improvement of the correction of the imaging.

An HMD according to certain embodiments is equipped with an imaging apparatus according to the present disclosure. In particular, the HMD can be embodied as spectacles and thus represent smartglasses. The use of an imaging apparatus makes it possible to produce HMDs—and in particular smartglasses—that can have a compact design in the region of the input coupling structure of the light guide.

Further features, properties and advantages of the present invention will become apparent from the following description of exemplary embodiments with reference to the accompanying figures.

Figure 1:
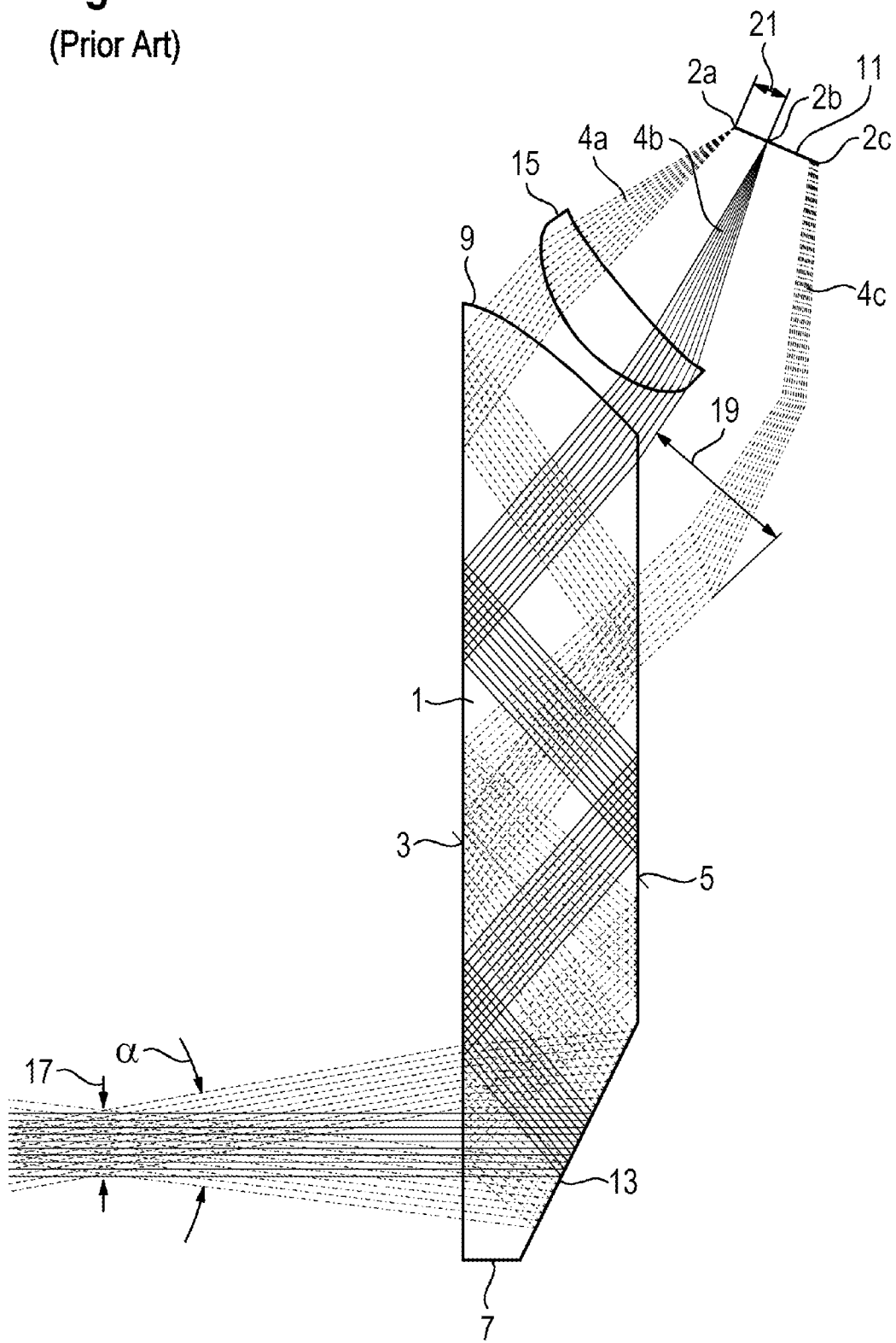
FIG. 1 shows a schematic illustration of an imaging apparatus with a light guide in accordance with the prior art.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

Before beginning the explanation of exemplary embodiments of the invention, an imaging apparatus with a light guide in accordance with the prior art will be explained with reference to FIG. 1. The figure shows an imaging apparatus as it can be used in an HMD, for example in smartglasses, in a schematic illustration. The illustrated imaging apparatus comprises a light guide 1 having a rear face 3 and a front face 5. If the imaging apparatus is used in an HMD, the rear face faces the eye of the user when the HMD is in use and the front face 5 faces away from the eye. The light guide 1 additionally has a perimeter face 7, of which an inclined section 9 serves as an input coupling face 9 (with or without imaging function) for beams coming from an image generator 11. The input coupling face 9 in this imaging apparatus forms the input coupling structure. The beams coupled into the light guide 1 are guided, by way of total internal reflections at the rear face 3 and the front face 5, in the light guide 1 to an output coupling structure in the form of a splitter mirror 13, which is arranged at an angle and from which said beams are coupled out of the light guide 1 through the rear face 3 and are superposed on the ambient light passing through the splitter mirror 13, with the result that a user of the HMD equipped with the imaging apparatus perceives a virtual image of the initial image floating in the environment. The location behind the rear face 3 at which all beams have a common cross section is the exit pupil 17. Important in HMDs is generally the eyebox. The eyebox is referred to as the three-dimensional region of the beams in which the pupil of the eye (not illustrated) can move without vignetting of the image taking place. Since, in the case of smartglasses, the distance of the eye with respect to the smartglasses is substantially constant, the eyebox can be reduced to a two-dimensional eyebox that only takes account of the rotational movements of the eye. In this case, the eyebox substantially corresponds to the exit pupil of the smartglasses at the location of the entrance pupil of the eye. The latter is generally given by the pupil of the eye. Therefore, only the exit pupil 17 is considered within the framework of the present description.

As is evident from FIG. 1, beams 4a, 4b, 4c coming from different initial image field points 2a, 2b, 2c of the initial image arrive at the exit pupil 17 from different angles, wherein the beams 4a, 4c coming from the outermost field points 2a, 2c form the margin of the totality of the beams in the region of the exit pupil 17. The angle $\alpha$ between the beams 4a, 4c coming from the outermost field points 2a, 2c represents the field angle of the initial image, which in the illustration of FIG. 1 is a horizontal field angle.

For the following considerations, it is expedient to consider the beam path in the reverse, that is to stay coming from the exit pupil 17 through the light guide 1 to the image generator 11. The totality of the beams coming from the exit pupil 17 has a field angle range in which all the beams are located. The respective angles of the individual beams with respect to the optical axis are here characteristic of the field point on which they are ultimately incident in the initial image represented on the image generator 11. As is evident from FIG. 1, the problem arises for the beam 4c, which is traveling from the exit pupil 17 toward the bottom right in FIG. 1, that, after the multiple reflection in the light guide 1, it does not exit from the side face 9 of the light guide 1 but from the front face 5 thereof. The reason herefor is that the field angle $\alpha$ results in great spreading of the totality of the beams as the distance of the beams from the exit pupil 17 increases. The result is merely that not all beams travel through said input coupling face 9 and the imaging optical unit 15 in the case of the input coupling face 9 illustrated in FIG. 1. The beams exiting through the front face 5 therefore cannot contribute to the imaging. This region that is not contributing to the imaging, i.e. is blocked, is marked in FIG. 1 by way of a double-headed arrow 19. This blocking leads to only the initial image field region 21 in the initial image represented on the image generator 11 being able to contribute to the generation of a virtual image. The initial image fields to be imaged are therefore subject to great constraints in the configuration illustrated in FIG. 1. If the aim is to circumvent these constraints by effecting the input coupling via the rear face 3 or the front face 5 rather than via a side face, this results in large input coupling structures and large imaging optical units owing to the large spreading of the totality of the beams. In addition, the input coupling structure and the output coupling structure will in this case be diffraction gratings or Fresnel structures having a strongly deflecting effect for the necessary bringing about of the total internal reflection. In the case of large field angles and/or a large eyebox, components of the beams transferred by the light guide 1 would be deflected by the diffraction grating forming the output coupling structure or by the Fresnel structure forming the output coupling structure such that, rather than being coupled out, they are reflected back onto the output coupling structure by an interface of the light guide 1 with air and are incident on said output coupling structure a second time. Such components of the beams, however, are not suitable for the imaging and result in a reduction of the image field sizes or pupil sizes. This effect is also known as "footprint overlap."

A first exemplary embodiment of an imaging apparatus in which the problem described with reference to FIG. 1 is reduced will be described below with reference to FIG. 2.

The figure shows a light guide 1 with a rear face 3 and a front face 5 and also with a perimeter face 7. A side face of the perimeter face 7 in the present exemplary embodiment serves as an input coupling face 9 and thus as the input coupling structure of the light guide 1. The light guide 1 furthermore comprises an output coupling structure 13, which, in the present exemplary embodiment, is formed by two planar output coupling mirrors $13_1$ and $13_2$, which are tilted with respect to each other and designed in the form of splitter mirrors. The output coupling mirrors $13_1$, $13_2$ in the present exemplary embodiment are structures that are embedded in the light guide 1. Said structures can be produced for example by grinding the light guide 1 in the region of the side face opposite the input coupling face 9 such that the mirror faces $13_1$, $13_2$ are formed. The latter are then made partially reflective and finally a wedge-shaped attachment piece is applied onto the partially reflective faces to restore the original shape of the light guide 1. As in the light guide from FIG. 1, the beams are guided from the input coupling face 9 to the output coupling structure by way of total internal reflection at the rear face 3 and the front face 5.

Figure 2:
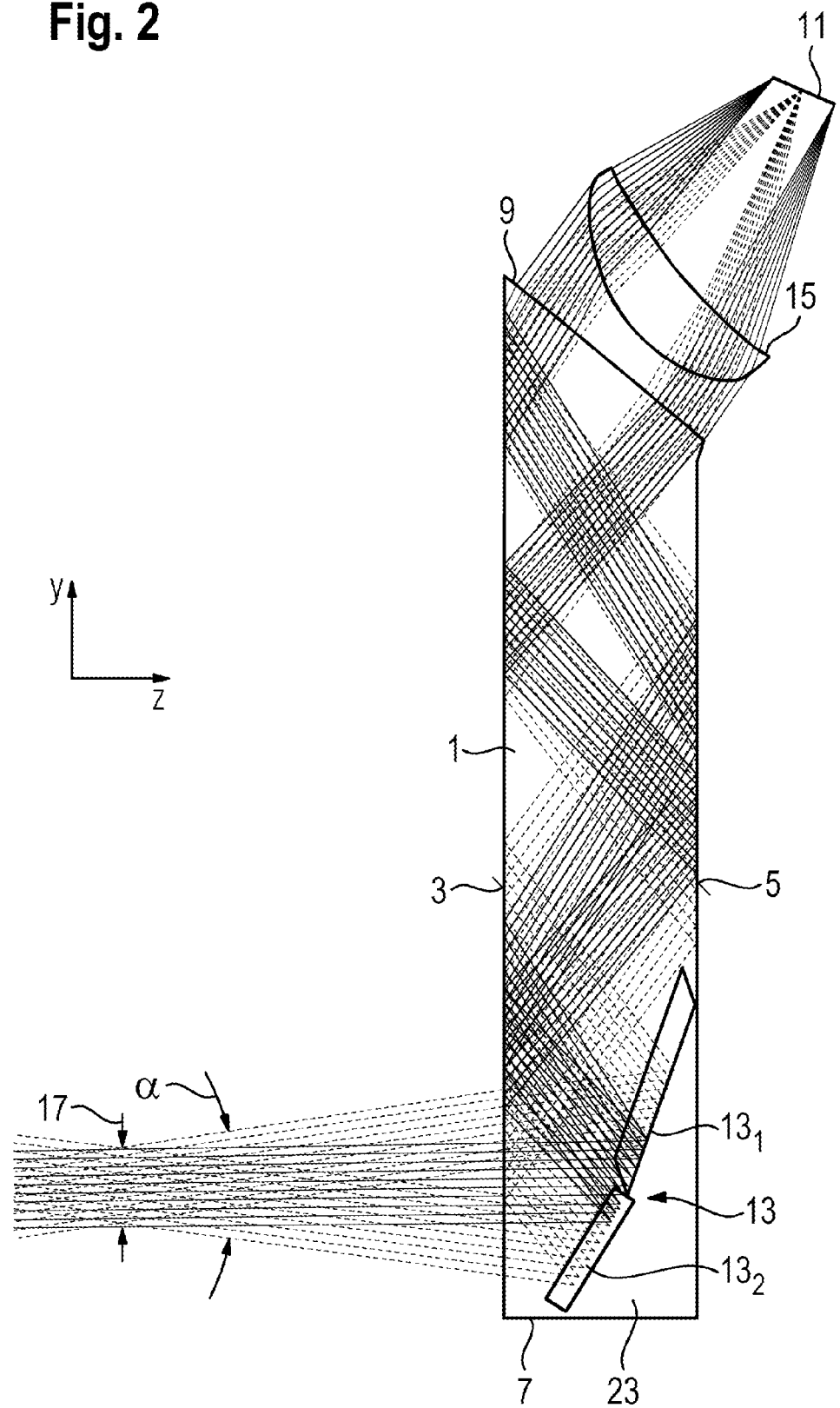
FIG. 2 shows a schematic illustration of a first exemplary embodiment of an imaging apparatus with a light guide in which partial faces of the output coupling structure of the light guide are tilted with respect to one another.

In addition to the light guide 1, FIG. 2 also shows an image generator 11, an imaging optical unit 15 and the exit pupil 17 of the imaging apparatus.

FIG. 2 additionally shows a coordinate system having an x-axis that extends into the plane of the sheet. The y-axis points upwardly in the plane of the sheet, and the z-axis points to the right in the plane of the sheet. As is evident in FIG. 2, the splitter mirror $13_2$ is tilted with respect to the splitter mirror $13_1$ about the x-axis and about the y-axis. The two splitter mirrors $13_1$, $13_2$ thus form partial faces of the output coupling structure 13 that are tilted with respect to each other.

To explain the initial effects of the tilting of the splitter mirror $13_2$ with respect to the splitter mirror $13_1$ about the x-axis and the associated embodiment of the output coupling structure 13 with two partial faces that are tilted with respect to each other, the beams traveling from the exit pupil 17 in the direction onto the image generator 11 are again considered, like it was done with reference to FIG. 1. By tilting the second splitter mirror $13_2$ with respect to the first mirror $13_1$ about the x-axis, the beams of the light guide 1 reflected by the second splitter mirror are displaced parallel to the y-z-plane as compared to the beams reflected by the splitter mirror $13_1$. As a consequence, if the beams coming from the exit pupil 17 at the field angle $\alpha$ are considered in the region of the input coupling face 9, the cross-sectional area occupied by the beams there is reduced in the z-direction or, more specifically, the projection of the cross-sectional area occupied by the beams in the region of the input coupling structure 9 onto the x-z plane has a smaller extent in the z-direction than is the case for the light guide from FIG. 1 (which does not have any partial regions of the output coupling structure 13 that are tilted with respect to one another). In other words, the beams move closer together in the region of the input coupling face 9. By comparison to the imaging apparatus from FIG. 1, it is thereby possible when the beams are coupled in through the input coupling face 9 arranged in the perimeter face 7 for a larger field angle $\alpha$ to be transferred by the light guide 1 or, if the field angle transferred is the same, for the thickness of the light guide 1 to be reduced.

Owing to the rotation about the y-axis, the beams coming from the exit pupil 17 are guided, depending on which mirror $13_1$, $13_2$ reflects them, through different regions of the light guide 1 that lie one above the other in the x-direction. The result is that the beams in the light guide reflected by the two mirrors $13_1$, $13_2$ diverge, in the projection onto the x-y-plane, in the x-direction and are deflected by regions of the input coupling mirror 25, which are located on top of one another in the x-direction, through the rear face 3 in the direction onto imaging optical units $15_1$, $15_2$ located one above the other in the x-direction. Through imaging optical units $15_1$, $15_2$, they finally pass onto image generators $11_1$, $11_2$, which are located one above the other in the x-direction. It thus becomes possible to distribute the initial image over two image generators $11_1$ lying one above the other in the x-direction, as a result of which field regions that are located horizontally next to one another in the virtual image can be initial image field regions that are arranged vertically one above the other in the initial image.

Owing to the rotation of the two mirror faces relative to one another both about the x-axis and about the y-axis, the required space of the cross-sectional area occupied by the beams along the z-direction can, in the projection of the beams located in the region of the input coupling structure 25 onto the x-z-plane, be reduced and, at the same time, be increased in the x-direction, wherein it is also possible for beams to be displaced from the z-direction into the x-direction. The associated freedom in the distribution of image generator sections of the image generator 11 makes it possible to transfer particularly large horizontal field angles α, which in particular also makes the transfer from the 16:9 format possible. In this case, the image generator sections of the image generator 11 can be optimally adapted in terms of their distance and their respective emission angle to the profile of the beams in the light guide.

A second exemplary embodiment of a light guide according to the invention will be described below with reference to FIG. 3. This figure likewise shows a light guide 1 having an inner face 3, a front face 5 and a perimeter face 7, but where the beams are coupled into the light guide 1 through the rear face 3. In the perimeter face 7, a reflective input coupling face 25 is formed here, via which the beams entering the light guide 25 through the rear face 3 are deflected such that they are guided to an output coupling structure 13 by way of total internal reflection between the rear face 3 and the front face 5. The beams are finally coupled out of the light guide 1 from this output coupling structure 13 through the rear face 3 in the direction of the exit pupil 17.

Figure 3:
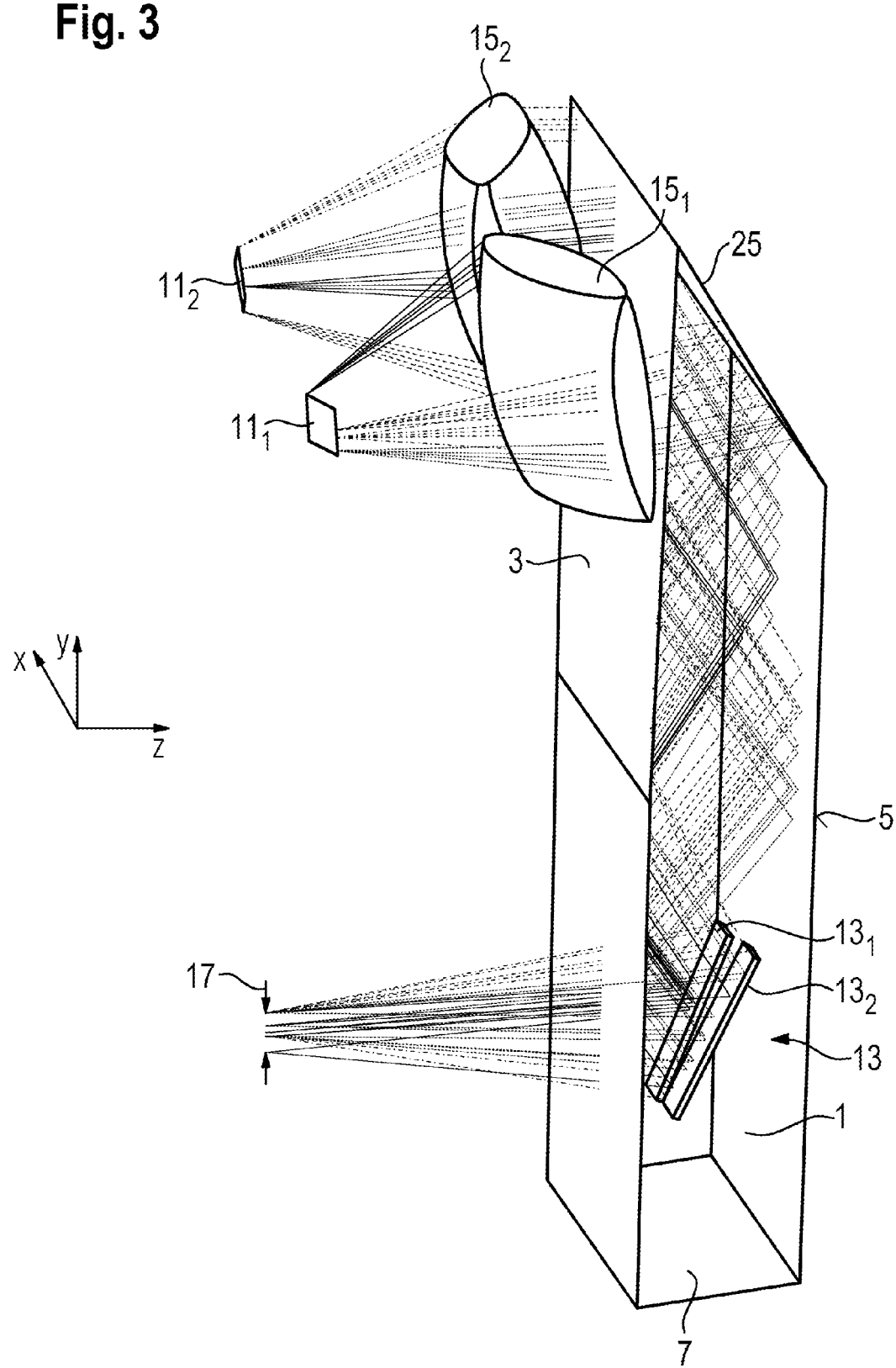
FIG. 3 shows a schematic illustration of a second exemplary embodiment of an imaging apparatus with a light guide in which partial faces of the output coupling structure of the light guide are tilted with respect to one another.

As in the first exemplary embodiment, the output coupling structure 13 comprises two mirror sections 13$_1$ and 13$_2$, the reflective faces of which are rotated relative to one another about the x-axis, extending into the plane of the sheet, and also about the y-axis, extending upwardly in the plane of the sheet in FIG. 3. As is evident in FIG. 3, the image generator sections in the present exemplary embodiment are realized by way of separate image generators 11$_1$, 11$_2$ and having different inclinations with respect to the x-y-plane. The adaptation of the inclination with respect to the x-y-plane and the choice of the spacing between the two image generators 11$_1$, 11$_2$ in the x-direction in the present exemplary embodiment serves to optimize the correction of the imaging.

Figure 4:
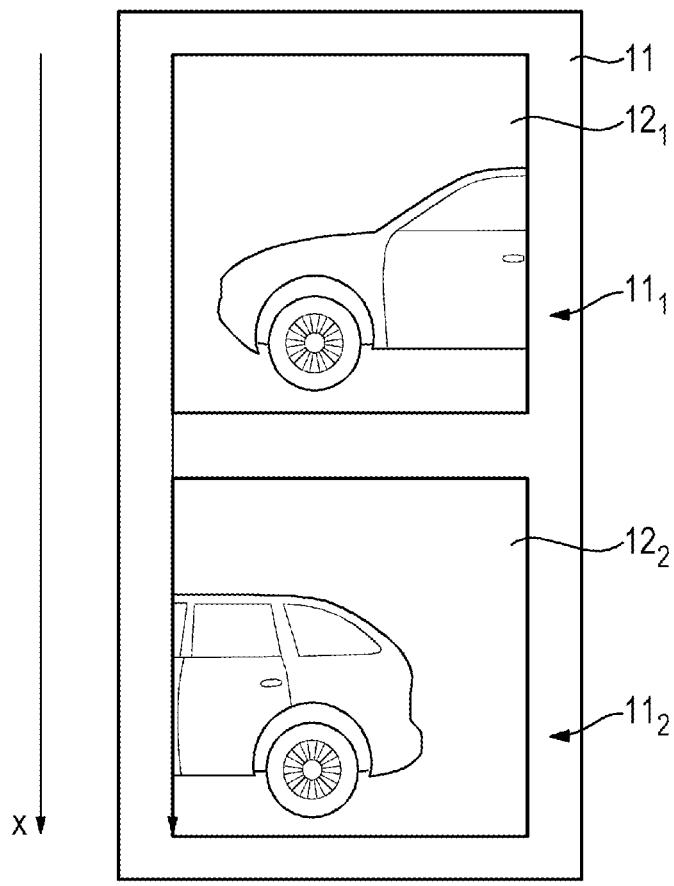
FIG. 4 shows a possible arrangement of initial image field regions of an initial image on a display.
Figure 5:
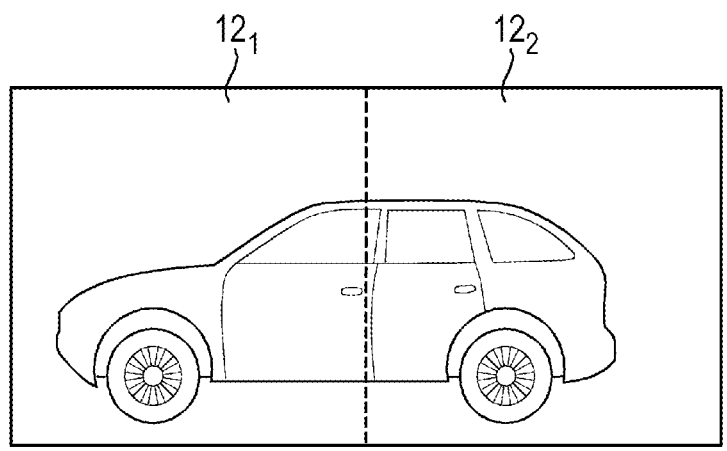
FIG. 5 shows the virtual image generated by the imaging apparatus based on the initial image field regions of the initial image from FIG. 4.
Figure 6:
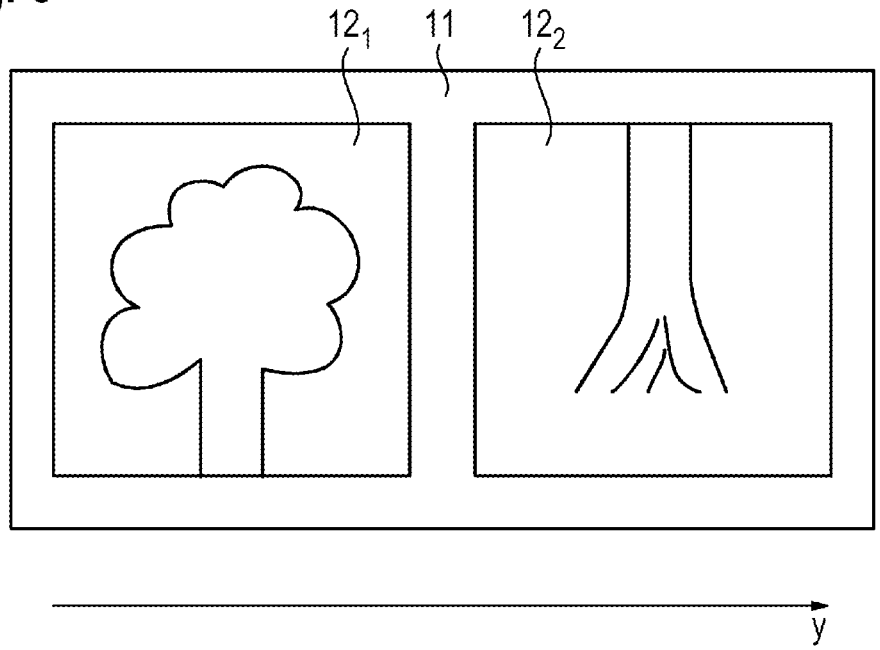
FIG. 6 shows a possible alternative arrangement of initial image field regions of an initial image on a display.
Figure 7:
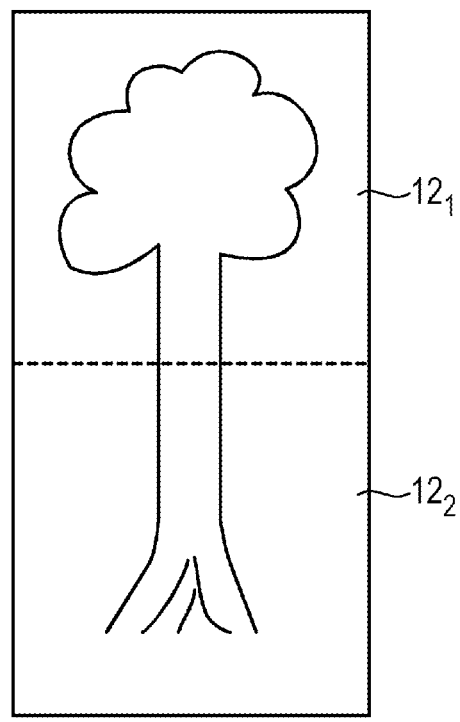
FIG. 7 shows the virtual image generated by the imaging apparatus based on the initial image field regions of the initial image from FIG. 6.

Although two separate image generators 11$_1$, 11$_2$ are used in FIG. 3, it is also possible to represent the initial image field regions on image generator sections 11$_1$, 11$_2$ of a single image generator 11 having a correspondingly large extent in particular in the x-direction. Such an image generator 11 is illustrated in FIG. 4. The image generator sections 11$_1$, 11$_2$ representing the initial image field regions 12$_1$, 12$_2$ are arranged with an offset along the x-direction. The arrangement of the initial image field regions 12$_1$, 12$_2$ in the virtual image generated by the imaging apparatus is shown in FIG. 5. However, if one, large image generator 11 is used, the degrees of freedom for optimizing the correction of the imaging are decreased. There is merely still the possibility of optimizing the spacing of the image generator sections 11$_1$, 11$_2$, represented by the initial image field regions 12$_1$, 12$_2$, in the x-direction, provided the image generator 11 has the corresponding extent in the x-direction. Tilting the image generator sections 11$_1$, 11$_2$ differently with respect to the x-z-plane, on the other hand, is not possible if one large image generator 11 is used. It should be noted that the image generator sections 11$_1$, 11$_2$ can also represent mutually overlapping initial image field regions 12$_1$, 12$_2$. One alternative arrangement of the image generator sections 11$_1$, 11$_2$ in which the image generator sections 11$_1$, 11$_2$ are offset in the y-direction is shown in FIG. 6, and the resulting image in FIG. 7.

Figure 8:
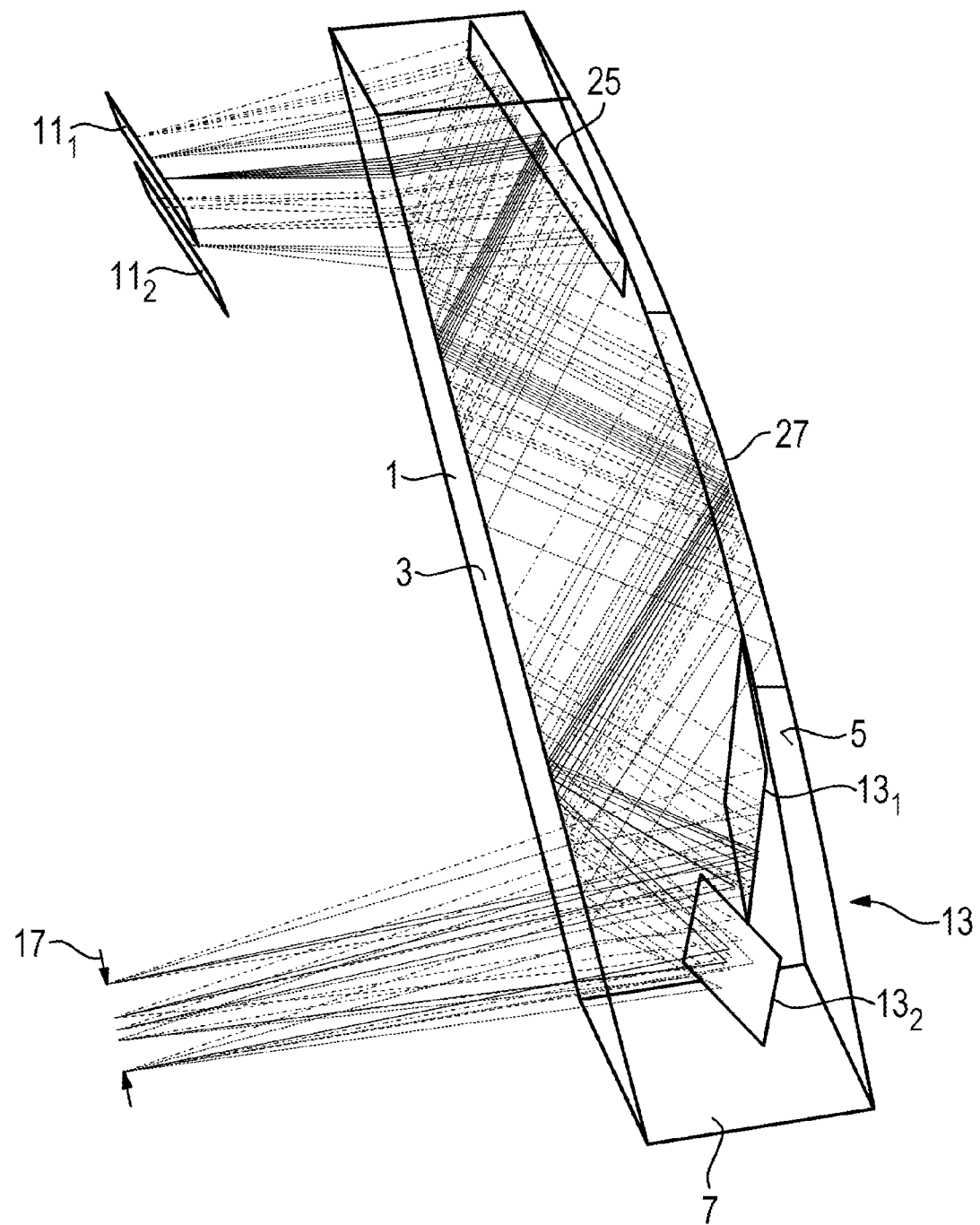
FIG. 8 shows a schematic illustration of a third exemplary embodiment of an imaging apparatus with a light guide in which partial faces of the output coupling structure of the light guide are tilted with respect to one another.

In the first two exemplary embodiments, the output coupling structure had no imaging function at all. If the output coupling structure is provided with an imaging function, it is possible to further reduce the required space of the beams in the z-direction. One exemplary embodiment in which the output coupling structure 13 has an imaging function is illustrated in FIG. 8. In this exemplary embodiment, the splitter mirrors 13$_1$, 13$_2$, which form the partial faces of the output coupling structure 13, are tilted both about the x-axis and about the y-axis, and the image generators 11$_1$, 11$_2$ are arranged with an offset with respect to one another along the x-direction. As compared to the previous exemplary embodiments, however, the imaging apparatus in FIG. 8 has no imaging optical unit 15 or 15$_1$, 15$_2$ outside the light guide 1. Instead, the partially transmissive input coupling mirror 25 of the light guide, the splitter mirrors 13$_1$, 13$_2$, and a further reflective element in the form of a splitter mirror 27 each have an imaging function. The additional splitter mirror 27 is arranged here on the front face 5 of the light guide 1. Acting together, the imaging functions of said elements replace the imaging optical unit of the previous exemplary embodiments.

The splitter mirrors 13$_1$, 13$_2$ used for coupling out, the partially transmissive input coupling mirror 25, and the further splitter mirror 27 in the present exemplary embodiment each have a converging function, meaning the beams coming from the image generators 11$_1$, 11$_2$ overall are collimated and exist in the exit pupil 17 as collimated beams. However, it is also possible to design the individual mirrors such that their converging effect is not enough to generate parallel beams, and slightly divergent beams are therefore present in the region of the exit pupil 17. This results in the virtual image not being perceived at infinity but at a finite distance. If the curvatures of the mirrors comprise a basic curvature and an overlaid freeform, it is additionally possible to optimize the correction of image aberrations.

Figure 9:
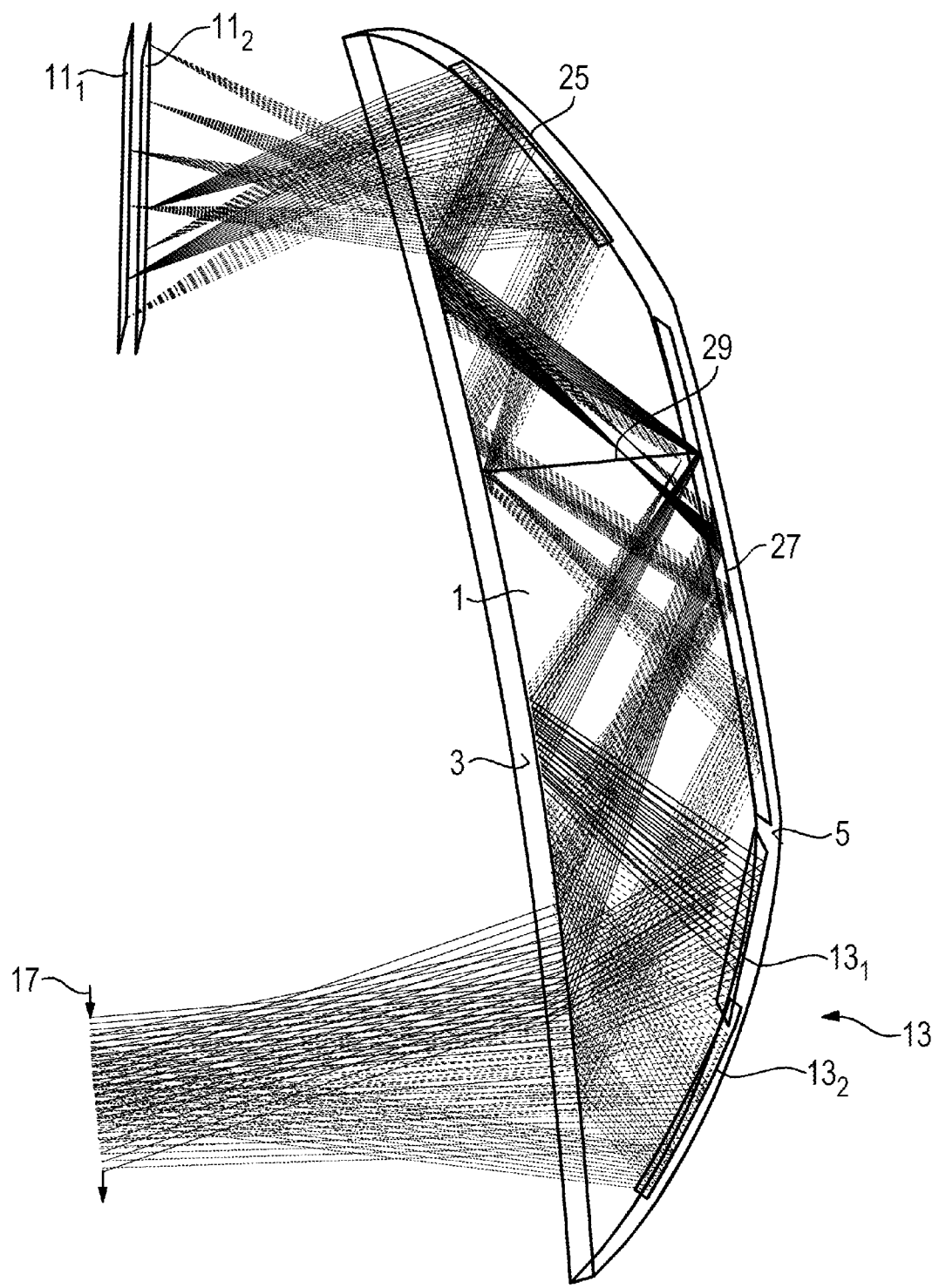
FIG. 9 shows a schematic illustration of a fourth exemplary embodiment of an imaging apparatus with a light guide in which partial faces of the output coupling structure of the light guide are tilted with respect to one another.

A further exemplary embodiment for the imaging apparatus is illustrated in FIG. 9. The light guide 1 of this imaging apparatus differs from the light guide of the imaging apparatus illustrated in FIG. 8 mainly in that the curvature of the splitter mirrors 13$_1$, 13$_2$ forming the output coupling structure 13 and of the additional splitter mirror 27 is substantially designed such that an intermediate image 29 is generated in the light guide 1 in a plane that is perpendicular to the y-z-plane and is not parallel to the x-y-plane. With this measure, a further reduction of the required space of the beams in the z-direction can be achieved in the region of the partially transmissive input coupling mirror 25, which further increases the transferable field angle α and thus the fields of view to be represented and simplifies the guidance of the beams through the light guides 1. For reducing the required space of the beams in the z-direction, it suffices here if an intermediate image is present in the plane perpendicular to the y-z-plane along a direction perpendicular to the x-direction, but not along a direction parallel to the x-direction.

In all exemplary embodiments, the light guide together with the image generator(s) and possibly an imaging optical unit arranged between the image generator(s) and the light guide forms an imaging apparatus for generating a virtual image based on an initial image represented on the image generator(s). If a plurality of image generators are used, the initial image sections represented on the respective image generators represent different initial image field regions of the initial image. Such an imaging apparatus can be used in particular in an HMD. An example of an HMD shown are smartglasses 201 in FIG. 10, that is to say an HMD that is embodied in the form of spectacles that make the simultaneous observation of a virtual image and of the environment possible.

Figure 10:
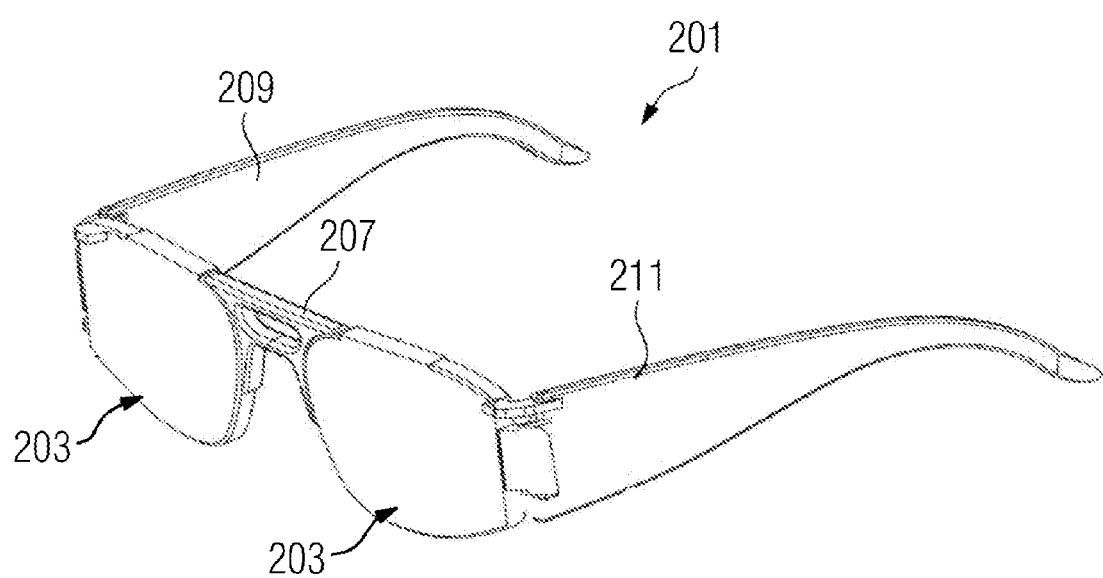
FIG. 10 shows one example of smartglasses.

The smartglasses 201 illustrated in FIG. 10 comprise a frame 207 with temples 211 and spectacle lenses 203 fitted in the frame 207. The spectacle lenses 203 are here embodied in the form of light guides according to the invention, which in each case form together with an image generator (not illustrated in FIG. 10) arranged in the corresponding temple 211 an image apparatus, which is embodied according to one of the previous exemplary embodiments. The spectacle lenses 203 can comprise here input and output coupling structures and possibly a further structure having imaging properties, as was described with reference to FIGS. 6 and 7, or imaging optical units are present between the spectacle lenses 203 and the image generators arranged in the temples 211, as is the case in the exemplary embodiments described with reference to FIGS. 2 and 3. The beams are coupled into the spectacle lenses 203 in the present exemplary embodiment via the side faces of the spectacle lenses 203 that adjoin the respective temple 211. It is also possible in the smartglasses 201 illustrated, however, to couple the beams for the imaging into the spectacle lenses 203 via the spectacle lens rear face.

Although FIG. 10 illustrates smartglasses as an example of an HMD, it is to be understood that other embodiment variants of an HMD can also be fitted with a light guide according to the invention. If the HMD is intended to be suitable for representing three-dimensional images, one light guide according to the invention and a display assigned to the light guide are present for each eye. If three-dimensional representation is not intended, it suffices to embody one of the two spectacle lenses 203 as a light guide according to the invention and to assign it a display and possibly an imaging optical unit arranged between the display and the spectacle lens.

The invention introduced on the basis of exemplary embodiments makes it possible to reduce the extent of the totality of the beams located in the region of the input coupling structure in the projection onto the x-z-plane. Since for example in the case of smartglasses the thickness of the spectacle lens extends substantially along the z-direction, this direction represents a critical plane for the extend of the totality of the beams. The invention introduced additionally makes it possible to distribute the initial image field to be represented in the light guide over two or more sections along the x-direction and to transport it through these different sections from the respective image generators to the output coupling structure. As a degree of freedom for the correction of the imaging, it has additionally proven advantageous if the image generators are adapted in each case in terms of distance and angle to the respective initial image field region they represent.

To attain the greatest advantage with respect to transporting large initial image fields, a combination of the design of the output coupling structure with two partial faces that are tilted with respect to one another with the described aspects of intermediate image generation is advantageous. In this case, these two partial faces are imaging faces, in particular converging faces, and have each a shape that is optimized for the initial image field region they transfer. The focal lengths of the two partial faces are selected here to be sufficiently short so that the exit pupil is imaged into the vicinity of the input coupling structure and preferably an intermediate image is produced at the same time in the light guide. However, a significant reduction in the required space of the beams in the z-direction is already achieved in the region of the input coupling structure if the partial faces of the output coupling structure are not designed to be imaging but merely consist of planar faces that are tilted with respect to one another.

The present invention has been described in detail on the basis of exemplary embodiments for purposes of explanation. However, a person skilled in the art recognizes that deviations from the exemplary embodiments are possible, which do not depart from the scope of protection defined in the attached claims. For example, it is possible that the output coupling structure has more than two partial faces that are tilted with respect to one another. Likewise, more than two image generators may be present. In addition, the image generators can, in addition to the offset in the x-direction, also have an offset in a direction perpendicular to the x-direction, although a suitable offset in this direction is limited by the thickness of the light guide, that is to say the distance between the rear face thereof and the front face thereof. Finally, it is possible to provide faceted mirror faces rather than the smooth, that is to say continuously differentiable, mirror faces. Said facets then have an inclination with respect to a typically smooth base face. This embodiment makes it possible to arrange the base faces parallel to the front face or rear face of the light guide. The facets of one partial face are here, however, tilted with respect to the facets of the other partial face. The imaging effect of the input coupling structure can additionally be realized not by a correspondingly curved reflective face, but by a curvature of a side face serving as the input coupling structure, through which the beams pass as they are coupled into the light guide, so that the side face forms a refractive imaging element.

The invention is not intended to be restricted by the exemplary embodiments described, but rather only by the appended claims.

The invention claimed is:

1. A light guide for an imaging apparatus for generating a virtual image from an initial image with at least two different initial image field regions, the light guide comprising:
   a front face;
   a rear face opposite the front face;
   a perimeter face connecting the front face to the rear face;
   an input coupling structure that commonly couples all beams coming from the at least two different initial image field regions of the initial image into the light guide via the rear face; and
   an extensive output coupling structure that couples the beams that were coupled into the light guide out of the light guide via the rear face, the extensive output coupling structure comprising at least two partial faces, wherein each partial face is assigned to a different one of the initial image field regions and couples out the beams coming from a corresponding one of the initial image field regions,
   wherein the partial faces of the output coupling structure are tilted with respect to one another, and
   wherein the partial faces of the output coupling structure are tilted about two non-parallel axes.

2. The light guide of claim 1, wherein the non-parallel axes about which the output coupling faces are tilted with respect to one another are perpendicular to the output coupling direction.

3. The light guide of claim 1, wherein each partial face of the output coupling structure is a reflective face.

4. The light guide of claim 1, wherein each partial face of the output coupling structure is a faceted reflective face comprising a smooth base face and facets that are inclined with respect to the base face, wherein the facets of the two partial faces are tilted with respect to one another.

5. The light guide of claim 1, wherein the output coupling structure has an imaging function.

6. The light guide of claim 5, wherein the output coupling structure has a light-converging function.

7. The light guide of claim 6, wherein, in addition to the output coupling structure, the light guide comprises a further reflective element, wherein the further reflective element has an imaging function.

8. The light guide of claim 5, wherein, in addition to the output coupling structure, the light guide comprises a further reflective element, wherein the further reflective element has an imaging function.

9. The light guide of claim 5, wherein an intermediate image is generated in the light guide between the input coupling structure and the output coupling structure.

10. An imaging apparatus for generating a virtual image with an image generator having at least two image generator sections for representing at least two initial image field regions of an initial image and the light guide as claimed in claim 1.

11. The imaging apparatus of claim 10, wherein the image generator sections are offset with respect to one another.

12. The imaging apparatus of claim 10, wherein the image generator sections are formed by mutually separate displays.

13. A head-mounted display (HMD) comprising the imaging apparatus of claim 10, wherein the rear face faces an eye of a user while the user is wearing the HMD.

14. The HMD of claim 13, which is configured as smartglasses.

15. The light guide of claim 1, wherein the input coupling structure comprises a singular mirror.

16. The light guide of claim 1, wherein all beams coming from the at least two different initial image field regions of the initial image are guided through a common section of the light guide.

17. The light guide of claim 1, wherein the partial faces of the output coupling structure comprise splitter mirrors.

18. A light guide for an imaging apparatus for generating a virtual image from an initial image with at least two different initial image field regions, the light guide comprising:
 a front face;
 a rear face opposite the front face;
 a perimeter face connecting the front face to the rear face;
 an input coupling structure that commonly couples all beams coming from the at least two different initial image field regions of the initial image into the light guide via the perimeter face; and
 an extensive output coupling structure that couples the beams that were coupled into the light guide out of the light guide via the rear face, the extensive output coupling structure comprising at least two partial faces, wherein each partial face is assigned to a different one of the initial image field regions and couples out the beams coming from a corresponding one of the initial image field regions,
 wherein the partial faces of the output coupling structure are tilted with respect to one another,
 wherein the partial faces of the output coupling structure are tilted about two non-parallel axes, and
 wherein the partial faces of the output coupling structure comprise diffraction gratings or splitter mirrors.

19. The light guide of claim 18, wherein the input coupling structure comprises a singular inclined section of the perimeter face of the light guide.

* * * * *